(12) United States Patent
Chindapol et al.

(10) Patent No.: US 7,984,356 B2
(45) Date of Patent: *Jul. 19, 2011

(54) ACKNOWLEDGMENTS OR NEGATIVE ACKNOWLEDGMENTS BY RELAY STATIONS AND SUBSCRIBER STATIONS

(75) Inventors: Aik Chindapol, Washington, DC (US); Nikolaj Marchenko, Klagenfurt (AT)

(73) Assignee: Nokia Siemens Networks Oy, Espoo (FI)

( * ) Notice: Subject to any disclaimer, the term of this patent is extended or adjusted under 35 U.S.C. 154(b) by 640 days.

This patent is subject to a terminal disclaimer.

(21) Appl. No.: 12/039,726

(22) Filed: Feb. 28, 2008

(65) Prior Publication Data

US 2008/0282126 A1 Nov. 13, 2008

Related U.S. Application Data

(63) Continuation-in-part of application No. 11/952,229, filed on Dec. 7, 2007.

(60) Provisional application No. 60/892,059, filed on Feb. 28, 2007, provisional application No. 60/885,929, filed on Jan. 22, 2007, provisional application No. 60/873,325, filed on Dec. 7, 2006.

(51) Int. Cl.
*G08C 25/02* (2006.01)

(52) U.S. Cl. ......... 714/748; 714/751; 370/334; 370/351

(58) Field of Classification Search ................... 714/751, 714/748; 370/334, 351
See application file for complete search history.

(56) References Cited

U.S. PATENT DOCUMENTS

| 7,778,598 | B2 | 8/2010 | Devroye et al. |
| 2003/0104784 | A1 | 6/2003 | Foschini et al. |
| 2003/0104808 | A1 | 6/2003 | Foschini et al. |
| 2006/0210070 | A1 | 9/2006 | Reznik et al. |
| 2006/0251175 | A1 | 11/2006 | Reznik et al. |
| 2007/0079742 | A1 | 4/2007 | Liu et al. |
| 2007/0217522 | A1 | 9/2007 | Sun et al. |
| 2008/0068979 | A1 * | 3/2008 | Visotsky et al. ............. 370/208 |
| 2008/0285499 | A1 * | 11/2008 | Zhang et al. .................. 370/315 |

OTHER PUBLICATIONS

Herhold et al., A simple cooperative extension to wireless relaying, Feb. 2004, International Zurich on communications IEEE, pp. 36-39.*
Herhold et al., Cooperative multi-hop transmission in wireless networks, Jun. 2005, Computer networks, vol. 49, pp. 299-324.*
Zheng, H et al., "Harq with Relays", IIEEE C802.16j-06/197r1, Retrieved from: www.ieee802.org/16/relay/index.html, whole document,(Nov. 7, 2006) pgs.

(Continued)

*Primary Examiner* — Sam Rizk
(74) *Attorney, Agent, or Firm* — Brake Hughes Bellermann LLP

(57) ABSTRACT

Various example embodiments are discloses. According to one example embodiment, a method may include sending a packet to both a relay station and a destination station in a wireless network, receiving a relay station acknowledgment (ACK) or negative acknowledgment (NACK) from the relay station during an ACK/NACK frame, and receiving a destination station ACK or NACK from the destination station during the ACK/NACK frame. The relay station ACK or NACK may either acknowledge or negatively acknowledge successful receipt of the packet by the relay station. The destination station ACK or NACK may either acknowledge or negatively acknowledge successful receipt of the packet by the destination station.

25 Claims, 5 Drawing Sheets

OTHER PUBLICATIONS

Lundqvist, H. et al., "TCP with End-toEnd Forward Error Correction", Technical Report, TRITA-IMIT-LCN R 03:03, ISSN 1651-7717, ISRN KTH/IMIT/LCN/R-03/03-SE, KTH, Royal Institute of Technology, (2004),pp. 1-4.

Suga, Junichi et al., "DL HARQ With Relays", IEE C802.16j-07/002r3, Jan. 18, 2007, pp. 1-7.

Chindapol, Aik et al., "Relay Assisted HARQ", IEEE C802.16j-06/266r1, Nov. 15, 2006, pp. 1-5.

Junichi, Suga et al., "DL HARQ Method for User_Transparent Relaying", IEEE C802.16j-06/126r2, Nov. 16, 2006, pp. 1-10.

Lin, S. et al., "Automatic Repeat-Request Error Control Schemes", IEEE Commun. Mg., vol. 12,, (Dec. 1984), pp. 5-17.

Nonnenmacher, J. et al., "Parity-Based Loss Recovery for Reliable Multicast Transmission", ACM SIGCOMM Computer Communication Revew, vol. 27,, (Oct. 1997),pp. 289-300.

Non-Final Office Action Response for U.S. Appl. No. 11/952,229, filed on Mar. 28, 2011, 11 pages.

Notice of Allowance for U.S. Appl. No. 11/952,229, mailed on May 13, 2011, 13 pages.

* cited by examiner

US 7,984,356 B2

ACKNOWLEDGMENTS OR NEGATIVE ACKNOWLEDGMENTS BY RELAY STATIONS AND SUBSCRIBER STATIONS

PRIORITY CLAIM

This application claims the benefit of priority based on U.S. Patent Application No. 60/892,059, filed on Feb. 28, 2007, entitled, "DL Hybrid-ARQ Protocol in Multi-Hop System," the disclosure of which is hereby incorporated by reference.

This application is a continuation-in-part application of, and claims priority from and incorporates by reference, U.S. patent application Ser. No. 11/952,229, filed on Dec. 7, 2007, entitled "Cooperatively Relaying Using Dirty Paper Coding," which claimed the benefit of priority based on U.S. Provisional Patent Application Nos. 60/873,325 filed on Dec. 7, 2006, and 60/885,929 filed on Jan. 22, 2007, the disclosures of all three of which are hereby incorporated by reference.

TECHNICAL FIELD

This description relates to wireless networks.

BACKGROUND

In wireless networks, relay stations (or relay stations) may extend the coverage range of the network. Relay stations may, for example, receive and forward data between a source station and a destination station (or destination station or subscriber station). Relay stations may be used in, for example, IEEE 802.16 WiMax networks, 802.11 WLAN networks, or cellular telephone networks. Relay stations and/or destination stations and/or source stations may provide feedback such as acknowledgements (ACKs) or negative acknowledgments (NACKs) to provide for reliable communications.

SUMMARY

According to one general aspect, a method may include sending a packet to both a relay station and a destination station, receiving a relay station acknowledgment (ACK) or negative acknowledgment (NACK) from the relay station during an ACK/NACK frame, and receiving a destination station ACK or NACK from the destination station during the ACK/NACK frame. The relay station ACK or NACK may either acknowledge or negatively acknowledge successful receipt of the packet by the relay station. The destination station ACK or NACK may either acknowledge or negatively acknowledge successful receipt of the packet by the destination station.

According to another general aspect, an apparatus may include a memory, a wireless transceiver, and a controller. The memory may be configured to store a packet. The wireless transceiver may be configured to send the packet to both a relay station and a destination station, receive a relay station acknowledgment (ACK) or negative acknowledgment (NACK) from the relay station during an ACK/NACK frame, the relay station ACK or NACK either acknowledging or negatively acknowledging successful receipt of the packet by the relay station, and receiving a destination station ACK or NACK from the destination station during the ACK/NACK frame, the destination station ACK or NACK either acknowledging or negatively acknowledging successful receipt of the packet by the destination station. The controller may be configured to process the relay station ACK or NACK and the destination station ACK or NACK.

The details of one or more implementations are set forth in the accompanying drawings and the description below. Other features will be apparent from the description and drawings, and from the claims.

DETAILED DESCRIPTION

A wireless relay network may include a source station, one or more relay stations, and one or more destination stations or subscriber stations. The relay stations may, for example, extend the range or coverage area and/or capacity of the source station by receiving and forwarding data between the source station and the one or more destination stations. Or, the relay stations may retransmit packets which were sent by the source station and successfully received by the relay station but not by the destination station, or which were sent by the destination station and successfully received by the relay station but not by the source station. The relay network may include one "hop," in which the one or more relay stations receive and forward the data directly to and from the parent station and destination station, or multiple hops, in which the relay stations may receive the data from and/or forward the data to other relay stations in the wireless relay network.

Figure 1:
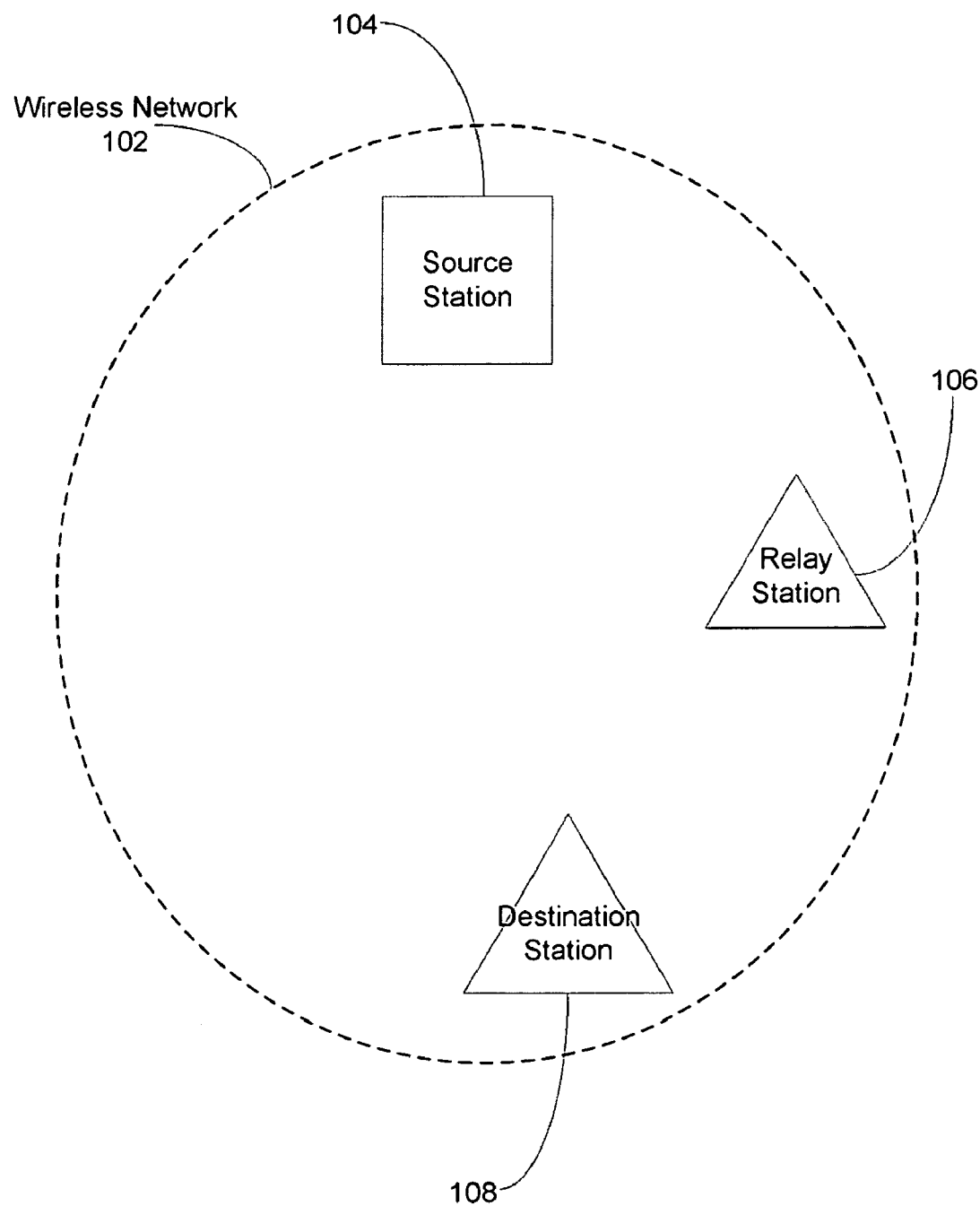
FIG. 1 is a block diagram of a wireless network according to an example embodiment.

FIG. 1 is a block diagram of a wireless network 102 according to an example embodiment. According to this example, the wireless network 100 may include a network in which a plurality of stations communicate via an air interface, such as an IEEE 802.16 WiMax network, an IEEE 802.11 WLAN network, or a cellular telephone network, as non-limiting examples. While the example shown in FIG. 1 shows a single source station 104, relay station 106, and destination station 108, any number of source stations 104, relay stations 106, and destination stations 108 may be included in the wireless network 102.

The source station 104 may include an 802.16 source station, an 802.11 access point, a cellular source station, or a node B, according to various example embodiments. The relay station 106 may be configured to receive and forward messages or packets or bursts between the source station 104 and the destination station 108, or to retransmit packets which were not successfully received by either the source station 104 or the destination station 108. The relay station 106 may be mobile or fixed. The destination station 108 may include a cellular phone, smartphone, personal digital assistant (PDA), notebook computer, or other wireless device or subscriber station, according to example embodiments.

Figure 2A:
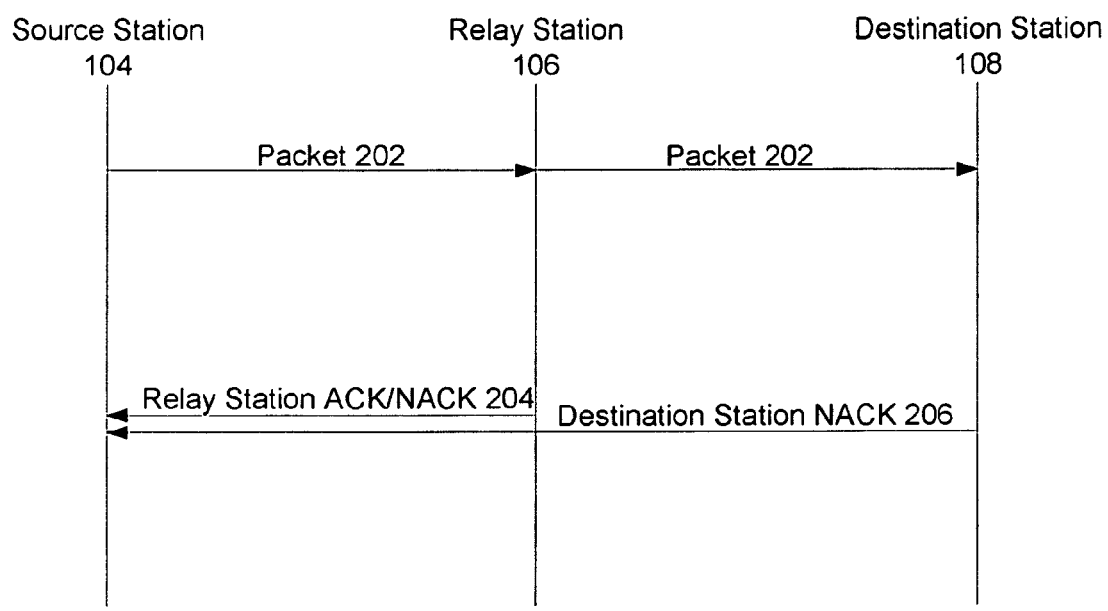
FIG. 2A is a vertical-time sequence diagram showing communications between a source station, a relay station, and a destination station according to an example embodiment.

FIG. 2A is a vertical-time sequence diagram showing communications between the source station 104, the relay station 106, and the destination station 108 according to an example embodiment. In this example, the source station 104 may send a packet 202 to the relay station 106 and the destination station 108. The packet 202 may, for example, include an 802.16 hybrid automatic repeat request (HARQ) packet. The packet 202 may include data intended for use by the destination station 108. In an example embodiment, the packet 202 may include a downlink hybrid automatic repeat request (DL HARQ) map assigning frequency and time allocations for the relay station 106 and the destination station 108 to send acknowledgments (ACKs) and/or negative acknowledgments (NACKs). In another example, the source station 104 may assign frequency and time allocations for the relay station 106 and the destination station 108 to send acknowledgments (ACKs) and/or negative acknowledgments (NACKs) before sending the packet 202, such as in a previous packet or by sending an ACK/NACK map to the relay station 106 and destination station 108. The source station 104 may assign the frequency and time allocations for the relay station 106 and the destination station 108 within a same packet (such as within a DL HARQ map), or within separate packets, according to example embodiments.

Upon receipt of the packet 202, the relay station 106 and destination station 108 may determine whether they successfully received the packet 202. The relay station 106 and destination station 108 may determine whether they successfully received the packet 202 by various error detection techniques, such as parity checking matrices or cyclic redundancy coding. These are merely examples.

The relay station 106 may send a relay station ACK or NACK (relay station ACK/NACK) 204 to the source station 104 based on the determination of whether the relay station 106 successfully received the packet 202. The relay station 106 may send the relay station ACK/NACK 204 during an ACK/NACK frame. The ACK/NACK frame may, for example, include a time slot assigned by the source station 104.

The destination station 108 may send a relay station ACK or NACK (relay station ACK/NACK) 206 to the source station 104 based on the determination of whether the destination station 108 successfully received the packet 202. The destination station 108 may send the destination station ACK/NACK 206 during the same ACK/NACK frame as the relay station 106 sent the relay station ACK/NACK 204. The destination station ACK/NACK 206 may be received by only the source station 104, or by both the source station 104 and the relay station 106.

In an example embodiment, the relay station ACK/NACK 204 and the destination station ACK/NACK may each occupy less than the full ACK/NACK frame. The ACK/NACK frame may, for example, include a specified time interval for transmission of packets, ACKs, or NACKs. In an example embodiment, packets, such as the packet 202, may occupy time slots with a time duration equal to that of the ACK/NACK frame. However, the ACKs and NACKs may require less time than those time slots equal in time duration to the ACK/NACK frame.

In an example embodiment, the relay station 106 may send the relay station ACK/NACK 204 during a different time within the ACK/NACK frame, and via a different frequency range, than the destination station 108 sends the destination station ACK/NACK 206. In another example embodiment, the relay station 106 may send the relay station ACK/NACK 204 during a different time within the ACK/NACK frame, and via a different frequency range, than the destination station 108 sends the destination station ACK/NACK 206. In another example embodiment, the relay station 106 may send the relay station ACK/NACK 204 during a same time within the ACK/NACK frame, and via a different frequency range, than the destination station 108 sent the destination station ACK/NACK 206.

In another example embodiment, the relay station 106 may send the relay station ACK/NACK 204 during a same time within the ACK/NACK frame, and via a same frequency range, as the destination station 108 sent the destination station ACK/NACK 206. In this example, the source station 104 may distinguish and decode the relay station ACK/NACK 204 and the destination station ACK/NACK 206 by a code division multiple access (CDMA) technique, such as by multiplying the relay station received signal by mutually orthogonal codes to recover the ACK/NACK 204 and the destination station ACK/NACK 206. Or, the source station 104 may distinguish and decode the relay station ACK/NACK 204 and the destination station ACK/NACK 206 by a space division multiple access technique, such as by using an antenna or transceiver which distinguishes between signals received from different directions.

In another example embodiment, the relay station 106 may send the relay station ACK/NACK 204 during a same time within the ACK/NACK frame, and via a same frequency range, as the destination station 108 sends the destination station ACK/NACK 206, but the relay station 106 and the destination station 108 may use different signal strengths, or different phase offsets or both different signal strengths and different phase offsets. The source station 104 may sum the relay station ACK/NACK 204 and the destination station ACK/NACK 206 and decode the sum based on the different signal strengths of the relay station ACK/NACK 204 and the destination station ACK/NACK 206. For example, if the relay station 106 transmitted the relay station ACK/NACK 204 so that the relay station ACK/NACK 204 would be received with twice the signal strength as the destination station ACK/NACK 206, and for each station 106, 108 a zero indicated an ACK and a one (which would have a strength of two for the relay station 106 because it has twice the signal strength) indicated a NACK, then a sum of zero could be interpreted by the source station 104 as an ACK from both the relay station 106 and the destination station 108, a sum of one could be interpreted as an ACK from the relay station 106 but a NACK from the destination station 108, a sum of two could be interpreted as a NACK from the relay station 106 and an ACK from the destination station 108, and a sum of three could be interpreted as a NACK from both the relay station 106 and the destination station 108.

In another example embodiment, the relay station 106 may send the relay station ACK/NACK 204 during a same time within the ACK/NACK frame, and via a same frequency range, as the destination station 108 sends the destination station ACK/NACK 206, but the relay station 106 and the destination station 108 may use different orthogonal codes from a predefined set. These orthogonal codes may be designed in such a way that the combined signal from the destination ACK/NACK and the relay station ACK/NACK form another orthogonal code that can be easily detected at the source station.

In another example embodiment, the relay station 106 may send the relay station ACK/NACK 204 during a same time within the ACK/NACK frame, and via a same frequency range, as the destination station 108 sends the destination station ACK/NACK 206, but the relay station 106 and the destination station 108 may use different signals assuming a priori information received at one of the receiving stations. For example, if the relay station 106 receives a very strong signal from the source station 104, the relay station 106 may infer that the destination station 108 should be able to decode the message and send an ACK message. The relay station 106 uses this knowledge to transmit or encode an ACK message to maximize the probability that the source station 104 is able to decode both ACK messages correctly. Vice versa, if the relay station 106 receives a very weak signal from the source station 104, the relay station 106 may infer that the destination station 108 will not be able to decode the message and send a NACK message. The relay station 106 may use this knowledge to transmit or encode a NACK message to maximize the probability of the source station 104 being able to decode both NACK messages correctly. In another example embodiment, the relay station 106 may send the relay station ACK/NACK 204 during a same time within the ACK/NACK frame, and via a same frequency range, as the destination station 108 sends the destination station ACK/NACK 206, and the source station 104 may decode the relay station ACK 204 and the destination station 206 by a dirty paper decoding technique.

If the destination station 108 did not correctly receive the packet 202, the packet 202 may be retransmitted to the destination station 108. Either the source station 104 or the relay station 106 may retransmit the packet 202. If neither the relay station 106 nor the destination station 108 successfully received the packet 202, then the source station 104 may retransmit the packet 202. However, if the relay station 106 successfully received the packet 202 but the destination station 108 did not successfully receive the packet 202, then either the source station 104 or the relay station 106 may retransmit the packet 202.

Figure 2B:
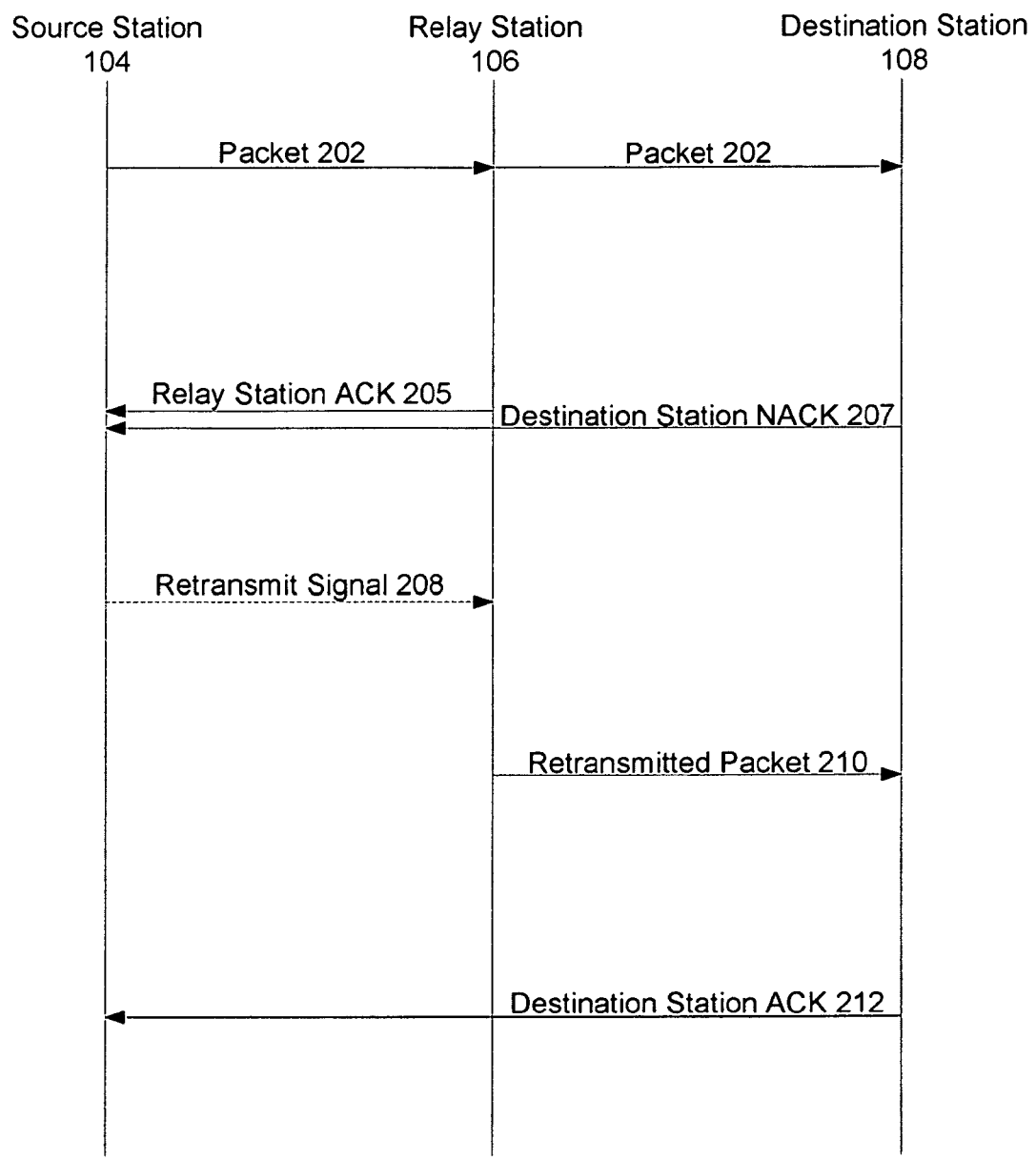
FIG. 2B is a vertical-time sequence diagram showing communications between the source station, the relay station, and the destination station according to another example embodiment.

FIG. 2B is a vertical-time sequence diagram showing communications between the source station 104, the relay station 106, and the destination station 108 according to another example embodiment. In this example the source station 104 sent the packet 202 to the relay station 106 and the destination station 108, and the relay station 106 successfully received the packet 202, but the destination station 108 did not successfully receive the packet 202. In this example, the relay station 106 may send a relay station ACK 205 to the source station 104 acknowledging successful receipt of the packet 202, and the destination station 108 may send a destination station NACK 207 to the source station 104 indicating that the destination station 108 did not successfully receive the packet 202.

In an example embodiment, the source station 104 may send a retransmit signal 208 to the relay station 106 instructing the relay station 106 to retransmit the packet 202. The source station 104 may send the retransmit signal 208 to the relay station 106 in response to receiving the destination station NACK 207. The source station 104 may send the retransmit signal 208 to the relay station via the air interface, or via the backbone network, according to example embodiments.

In response to receiving the retransmit signal 208, the relay station 106 may send a retransmitted packet 210 to the destination station 108. The retransmitted packet 210 may include the data from the packet 202. The retransmitted packet 210 may, for example, be transmitted using a different encoding technique to increase the likelihood of successful receipt by the destination station 108.

The destination station 108 may receive the retransmitted packet 210 and determine whether the destination station 108 successfully received the retransmitted packet 210. If the destination station 108 determines that the retransmitted packet 210 was successfully received, then the destination station 108 may send a destination station ACK 212 to the source station 104 indicating that the retransmitted packet 210 was successfully received.

In another example embodiment, the relay station 106 may send the retransmitted packet 210 to the destination station 108 based on receiving the destination station NACK 207 from the destination station 108. In this example, no retransmit signal 208 may be sent. Also in this example, the destination station 108 may send the destination station ACK 212 to the source station 104 acknowledging successful receipt of the retransmitted packet 210.

Figure 3:
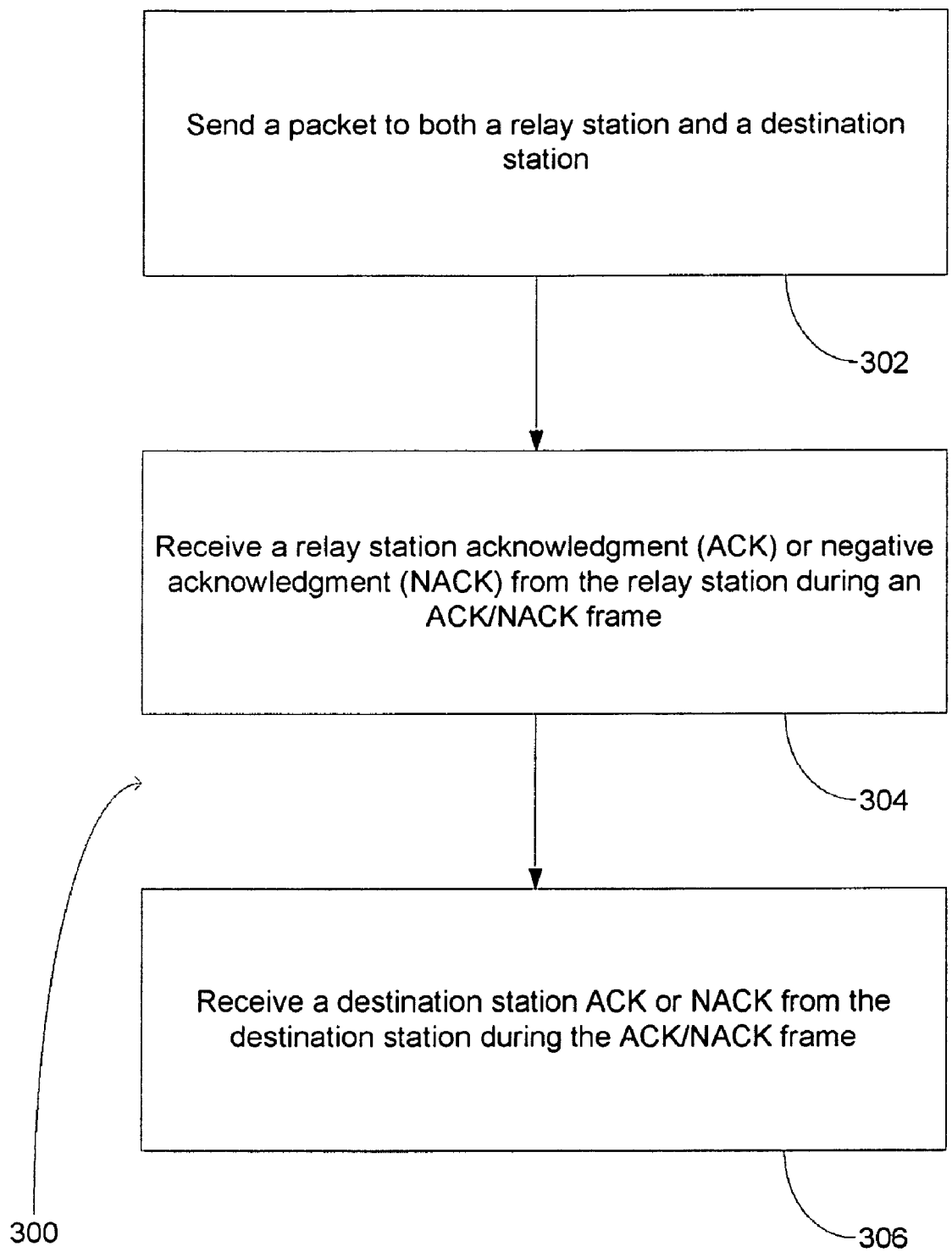
FIG. 3 is a flowchart showing a method according to an example embodiment.

FIG. 3 is a flowchart showing a method 300 according to an example embodiment. In an example embodiment, the method 300 may include sending a packet 202 to both a relay station 106 and a destination station 108 in a wireless network (302). The packet 202 may, for example, include a downlink hybrid automatic repeat request (DL HARQ) map assigning an ACK/NACK frame to both the relay station 106 and the destination station 108 for transmitting a relay station ACK or NACK 204 and the destination station ACK or NACK 206, respectively.

The method 300 may further include receiving the relay station ACK or NACK 204 from the relay station 106 during the ACK/NACK frame (304). The relay station ACK or NACK 204 may either acknowledge or negatively acknowledge successful receipt of the packet 202 by the relay station 106.

The method 300 may further include receiving the destination station ACK or NACK 206 from the destination station 108 during the ACK/NACK frame (306). The destination station ACK or NACK 206 may either acknowledge or negatively acknowledge successful receipt of the packet by the destination station 108. In an example embodiment, the receiving the destination station ACK or NACK 206 from the destination station 108 during the ACK/NACK frame (306) may include receiving a destination station NACK 207 from the destination station 108, and the method 300 may further include sending a retransmit signal 208 to the relay station 106 instructing the relay station 106 to retransmit the packet 202 to the destination station 108.

The relay station ACK or NACK 204 and the destination station ACK or NACK 206 may be received during the ACK/NACK frame at different times and via a different frequency range, at different times and via a same frequency range, at a same time and via a different frequency range, or at a same time and via a same frequency range. In an example embodiment, the method 300 may include summing the relay station ACK or NACK 204 and the destination station ACK or NACK 206 and decoding the sum based on different signal strengths of the relay station ACK or NACK 204 and the destination station ACK or NACK 206. In another example embodiment, the method 300 may further comprise decoding the relay station ACK or NACK 204 and the destination station ACK or NACK 206 by dirty paper decoding. In another example embodiment, the method 300 may further include decoding the relay station ACK or NACK 204 and the destination station ACK or NACK 206 by a code division multiple access (CDMA) technique. In another example embodiment, the method may further include distinguishing between the relay station ACK or NACK 204 and the destination station ACK or NACK by a space division multiple access technique.

Figure 4:
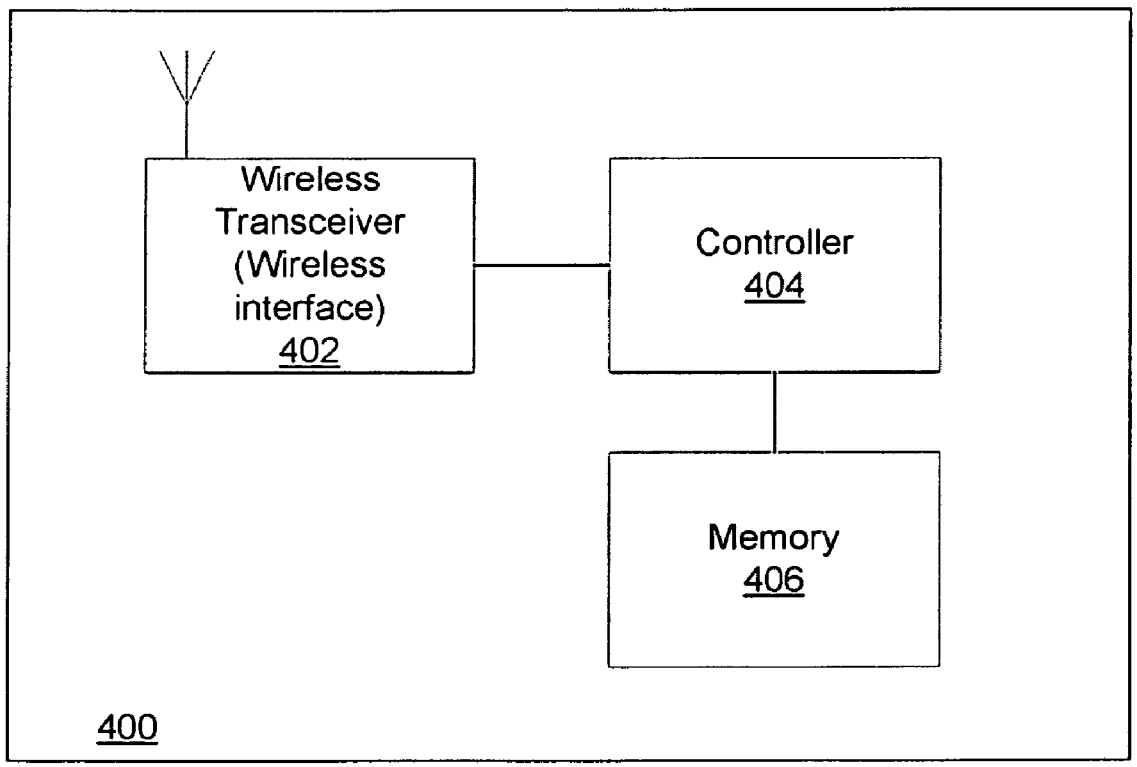
FIG. 4 is a block diagram showing an apparatus according to an example embodiment.

FIG. 4 is a block diagram showing an apparatus according to an example embodiment. The apparatus 400, which may include a source station 104, relay station 106, or destination station 108 according to example embodiments, may include a wireless transceiver 302 (or wireless interface), a controller 304, and a memory 306.

The memory 306 may be configured to store a packet 202, for example. The controller 304 may perform some operations described herein, such as processing and/or decoding the relay station ACK or NACK 204 and the destination station ACK or NACK 206. The wireless transceiver 302 may be configured to send the packet 202 to the relay station 106 and the destination station 108, and to receive the relay station ACK or NACK 204 and the destination station ACK or NACK 206, according to an example embodiment. The wireless transceiver 302 may include a single component with both transmission and reception capabilities, or a separate transmitter and receiver, according to example embodiments.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A method comprising:
sending a packet to both a relay station and a subscriber station in a wireless network;
receiving a relay station acknowledgment (ACK) or negative acknowledgment (NACK) from the relay station during an ACK/NACK frame, the relay station ACK or NACK either acknowledging or negatively acknowledging successful receipt of the packet by the relay station; and
receiving a subscriber station ACK or NACK from the subscriber station during the ACK/NAK frame, the subscriber station ACK or NACK either acknowledging or negatively acknowledging successful receipt of the packet by the subscriber station.

2. The method of claim 1, wherein the sending the packet includes sending the packet to the relay station and the subscriber station, the packet including a downlink hybrid automatic repeat request (DL HARQ) control message assigning the ACK/NACK frame to both the relay station and the subscriber station for transmitting the relay station ACK or NACK and the subscriber station ACK or NACK, respectively.

3. The method of claim 1, wherein:
receiving the relay station ACK or NACK from the relay station includes receiving a relay station ACK from the relay station;
receiving the subscriber station ACK or NACK from the subscriber station includes receiving a subscriber station NACK from the subscriber station; and
the method further includes sending a retransmit signal to the relay station instructing the relay station to retransmit the packet to the subscriber station.

4. The method of claim 1, wherein the relay station ACK or NACK and the subscriber station ACK or NACK are received at different times and via a different frequency range during the ACK/NACK frame.

5. The method of claim 1, wherein the relay station ACK or NACK and the subscriber station ACK or NACK are received at different times and via a same frequency range during the ACK/NACK frame.

6. The method of claim 1, wherein the relay station ACK or NACK and the subscriber station ACK or NACK are received at a same time and via a different frequency range during the ACK/NACK frame.

7. The method of claim 1, wherein the relay station ACK or NACK and the subscriber station ACK or NACK are received at a same time and via a same frequency range during the ACK/NACK frame.

8. The method of claim 7, further comprising summing the relay station ACK or NACK and the subscriber station ACK or NACK and decoding the sum based on different signal strengths, phase offsets, or both signal strengths and phase offsets, of the relay station ACK or NACK and the subscriber station ACK or NACK.

9. The method of claim 7, further comprising decoding the relay station ACK or NACK and the subscriber station ACK or NACK by dirty paper decoding.

10. The method of claim 7, further comprising decoding the relay station ACK or NACK and the subscriber station ACK or NACK, wherein the one or more of the receiving stations knows or infers a priori information of the other station's ACK or NACK, and uses that information to compose the ACK or NACK signal or to encode the ACK or NACK in order to minimize the interference or maximize the probability of successful decoding at the source station.

11. The method of claim 7, further comprising decoding each of the relay station ACK or NACK and the subscriber station ACK or NACK by a code division multiple access (CDMA) technique.

12. The method of claim 7, further comprising decoding a total signal received based on the relay station ACK or NACK and the subscriber station ACK or NACK by a code division multiple access (CDMA) technique.

13. The method of claim 7, further comprising distinguishing between the relay station ACK or NACK and the subscriber station ACK or NACK by a space division multiple access technique.

14. The method of claim 1, wherein the receiving the relay station ACK or NACK includes receiving the relay station ACK or NACK from the relay station, the relay station ACK or NACK being based at least in part on a received signal strength of the packet.

15. An apparatus comprising:
a memory configured to store a packet;
a wireless transceiver configured to:
send the packet to both a relay station and a subscriber station;
receive a relay station acknowledgment (ACK) or negative acknowledgment (NACK) from the relay station during an ACK/NAK frame, the relay station ACK or NACK either acknowledging or negatively acknowledging successful receipt of the packet by the relay station; and
receiving a subscriber station ACK or NACK from the subscriber station during the ACK/NACK frame, the subscriber station ACK or NACK either acknowledging or negatively acknowledging successful receipt of the packet by the subscriber station; and
a controller configured to process the relay station ACK or NACK and the subscriber station ACK or NACK.

16. The apparatus of claim 15, wherein the wireless transceiver is configured to send the packet to both the relay station and the subscriber station, the packet including a downlink hybrid automatic repeat request (DL HARQ) control message assigning the ACK/NACK frame to both the relay station and the subscriber station for transmitting the relay station ACK or NACK and the subscriber station ACK or NACK, respectively.

17. The apparatus of claim 15, wherein the transceiver is configured to receive the relay station ACK or NACK and the subscriber station ACK or NACK at different times and via a different frequency range during the ACK/NACK frame.

18. The apparatus of claim 15, wherein the transceiver is configured to receive the relay station ACK or NACK and the subscriber station ACK or NACK at different times and via a same frequency range during the ACK/NACK frame.

19. The apparatus of claim 15, wherein the transceiver is configured to receive the relay station ACK or NACK and the subscriber station ACK or NACK at a same time and via a different frequency range during the ACK/NACK frame.

20. The apparatus of claim 15, wherein the transceiver is configured to receive the relay station ACK or NACK and the subscriber station ACK or NACK at a same time and via a same frequency range during the ACK/NACK frame.

21. The apparatus of claim 20, wherein the transceiver is configured to distinguish between the relay station ACK or NACK and the subscriber station ACK or NACK by a space division multiple access technique.

22. The apparatus of claim 20, wherein the processor is configured to decode the relay station ACK or NACK and the subscriber station ACK or NACK by dirty paper decoding.

23. The apparatus of claim 20, wherein the processor is configured to decode a total signal received based on the relay station ACK or NACK and the subscriber station ACK or NACK by a code division multiple access (CDMA) technique.

24. The apparatus of claim 20, wherein the processor is configured to decode the relay station ACK or NACK and the subscriber station ACK or NACK by a code division multiple access (CDMA) technique.

25. The apparatus of claim 15, wherein the relay station ACK or NACK is based at least in part on a received signal strength of the packet.

* * * * *

UNITED STATES PATENT AND TRADEMARK OFFICE
CERTIFICATE OF CORRECTION

PATENT NO. : 7,984,356 B2  
APPLICATION NO. : 12/039726  
DATED : July 19, 2011  
INVENTOR(S) : Aik Chindapol et al.

Page 1 of 1

It is certified that error appears in the above-identified patent and that said Letters Patent is hereby corrected as shown below:

In column 8, line 34, in claim 1, delete "ACK/NAK" and insert -- ACK/NACK --, therefor.

In column 9, line 48, in claim 15, delete "ACK/NAK" and insert -- ACK/NACK --, therefor.

Signed and Sealed this  
Twentieth Day of September, 2011

David J. Kappos  
*Director of the United States Patent and Trademark Office*